No. 852,600. PATENTED MAY 7, 1907.
G. FLOQUET.
ELASTIC WHEEL.
APPLICATION FILED MAR. 14, 1905.
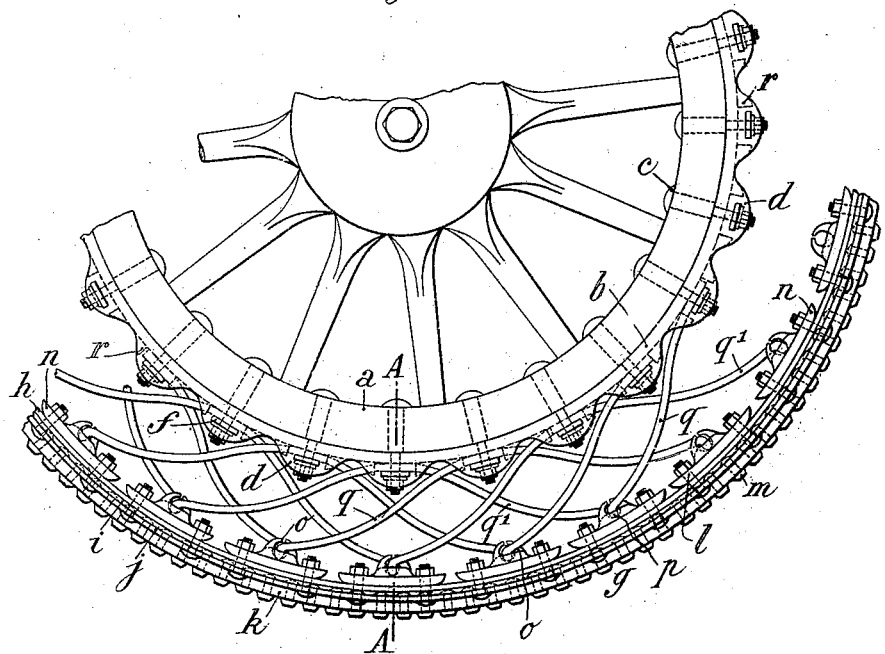

UNITED STATES PATENT OFFICE.

GASTON FLOQUET, OF PARIS, FRANCE.

ELASTIC WHEEL.

No. 852,600.      Specification of Letters Patent.      Patented May 7, 1907.

Application filed March 14, 1905. Serial No. 250,068.

*To all whom it may concern:*

Be it known that I, GASTON FLOQUET, a citizen of the Republic of France, and a resident of 42 Rue de Tocqueville, Paris, in the said Republic, gentleman, have invented certain new and useful Improvements in Elastic Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention refers to a wheel for motor cars, motor cycles and other vehicles the construction of which wheel affords the necessary elasticity without necessitating the employment of a pneumatic tire and which at the same time is suitable for the application thereto of a tire that is not subject to side slip.

This wheel consists of two concentric rims or fellies, one of which is rigidly connected to the nave, while between the two rims are interposed blade springs which are mutually independent, and quite free in their flexure movements but co-acting owing to the fact that the outer rim against which the end of each blade spring bears is formed as a band of leather or other supple and at the same time strong material. Each spring bears freely at one of its ends against a fixed point of the outer rim, while its other end is susceptible of a certain displacement along the periphery of the inner rim limited however by a stop on the said rim. There are several series of circularly arranged blade springs, three for example in the width of the rim, which are arranged parallel and comprise each the same number of springs, the springs in one series are all inclined in the same direction and the springs of the adjoining series are inclined in the opposite direction, so that a kind of elastic lattice is formed between the two rims. By reason of this arrangement the strain is distributed over a great number of springs, and that even under the most unfavorable conditions, that is to say when the tread or point of contact between the wheel and the road is between two axes of articulation.

Figure 1 of the accompanying drawing is a part side elevation of a wheel constructed according to this invention and Fig. 2 a vertical cross section on the line A—A Fig. 1.

The inner rim $a$ may for instance be of wood and united to the nave by means of wooden spokes; it is encircled by a metallic hoop $b$ which is provided with lugs $d$ the use of which will be described farther on. This hoop $b$ has peripheral flanges $e$ which form guides for the blade springs that are kept in place by small cross pieces $f$ which pass through the lugs $d$ and may also be fixed by the screw bolts $c$.

The outer rim $g$ is composed of a thick hoop $h$ of leather by preference chrome leather, upon which is mounted a rubber hoop $i$ and upon that again a hoop $j$ of leather thinner than the hoop $h$. These three thicknesses of the hoop materials are fixed together on the periphery by means of screw bolts $l$ which also serve to fix the chair plates that receive one of the ends of the blade springs as hereinafter to be described. Upon the hoop $j$ is fixed another narrow leather hoop $k$, the two hoops being united by rivets $m$, with projecting heads, forming an anti-side slipping device; the rubber band $i$ keeps the hoop $h$ from contact with the heads of the rivets.

Upon the hoop $h$ are arranged equidistant metallic plates $n$ fixed by the aforesaid screw bolts $l$. These plates are cast with chairs, three in the example shown, wherein the lower ends of the springs rest and which have horns $o$ to keep the springs from vertical displacement, and lugs $p$ to keep them from lateral displacement. It will be seen that the curved springs $q$ and $q'$ simply have their bearings in the chairs and can oscillate as if they were hinged. Their upper part comes between the hoop $b$ and the aforesaid cross pieces $f$, and the movement of their inner ends is limited by the stops $r$ on the hoop $b$.

The springs $q$ of the first and the third series incline in the same direction, as shown, while the springs $q'$ of the intermediate series incline in the opposite direction. These latter have at their free end an elongated slot through which the screw bolt $c$ passes freely and permitting the spring to freely move during its deflexion. As will be understood from Fig. 2 the openings in the three chairs on each plate $n$ are directed alternately to the front and to the rear according to the directions of the springs in their respective chairs.

During the rotation of the wheel, when the springs nearest the tread deflect, their free ends slide between the inner rim $b$ and the cross pieces $f$ and bear against the stops $r$ which limit their movement.

Claims

1. An elastic wheel for vehicles with two concentric rims the inner one rigidly connected with the nave and having between it and the outer rim which latter is of a supple and strong material several devices interposed side by side formed of curved blade springs, each of which when deflected pivots around one end while its other end slides freely till it meets a fixed stop, said springs being inclined in the same direction in each set but inclined in the opposite direction in the two adjoining sets.

2. An elastic wheel, comprising two concentric rims, a plurality of independent spring blades mounted in parallel series between said rims and inclined in one direction, and a series of oppositely inclined independent blades interposed between the aforesaid series.

3. An elastic wheel comprising a rigid rim, a flexible concentric rim, a plurality of independent curved spring blades rectangular in cross-section mounted in series between said rims, and bearings on the rims for the ends of the blades.

4. An elastic wheel comprising a rigid rim, a guideway formed on the periphery of said rim, an outer concentric rim, a plurality of bearings mounted on the inner face of the latter, a plurality of curved spring-blades each of which has one of its ends mounted in one of said bearings and its other end mounted in said guide-way.

5. An elastic wheel comprising a rigid rim, a guide-way formed on the periphery of said rim, an outer concentric flexible rim, a plurality of bearings mounted on the inner face of the latter, a plurality of curved spring-blades each of which has one of its ends pivoted in one of said bearings and its other end mounted in the guide-way, and an abutment in the latter for each of said blades.

6. An elastic wheel comprising a rigid rim, a plurality of peripheral guide-ways formed in the rim, a concentric laminated flexible rim surrounding said rigid rim, a plurality of bearing plates mounted on the inner periphery of the flexible rim, laterally mounted spring-blades pivoted on each of said plates inclined in one direction and slidable in said guide-ways, spring blades pivoted on each of said plates between the aforesaid blades and inclined in an opposite direction, and abutments in the guide-ways to engage the springs.

In testimony that I claim the foregoing as my invention, I have signed my name in presence of two subscribing witnesses.

GASTON FLOQUET.

Witnesses:
CHARLES ASH,
ALCIDE FABE.